United States Patent
Sprenger

(10) Patent No.: US 6,273,363 B1
(45) Date of Patent: Aug. 14, 2001

(54) AIRCRAFT WITH A DOUBLE-T TAIL ASSEMBLY

(75) Inventor: Wilfried Sprenger, Issendorf (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/546,456

(22) Filed: Apr. 10, 2000

(30) Foreign Application Priority Data

Apr. 9, 1999 (DE) .............................................. 199 16 132

(51) Int. Cl.[7] .................................................... B64C 1/26
(52) U.S. Cl. .............................. 244/13; 244/82; 244/119; D12/338
(58) Field of Search ................................ 244/2, 3, 13, 15, 244/117 R, 119, 120, 131, 87, 45 R, 36; D12/387, 338, 340

(56) References Cited

U.S. PATENT DOCUMENTS

| D. 189,327 | * | 11/1960 | Thieblot | D12/338 |
|---|---|---|---|---|
| D. 202,311 | * | 9/1965 | Rellis | D12/338 |
| 4,139,172 | | 2/1979 | Miller et al. . | |
| 4,390,150 | * | 6/1983 | Whitener | 244/45 R |
| 4,674,712 | * | 6/1987 | Whitener et al. | 244/119 |
| 5,115,999 | * | 5/1992 | Buchsel | 244/119 |
| 5,542,626 | * | 8/1996 | Beuck et al. | 244/119 |
| 5,692,704 | * | 12/1997 | Buttgereit et al. | 244/119 |
| 5,779,190 | | 7/1998 | Rambo et al. . | |
| 5,899,412 | * | 5/1999 | Dilorio et al. | 244/119 |

FOREIGN PATENT DOCUMENTS

WO98/17529 4/1998 (WO) .

OTHER PUBLICATIONS

"Out of the black comes Tacit Blue", Defence, Flight International, May 8 to 14, 1996, p. 17.
Aviation week and Space Tech. "747–136 and 137" pp. 38–9, Feb. 21, 1966.*

* cited by examiner

*Primary Examiner*—Galen L. Barefoot
(74) *Attorney, Agent, or Firm*—W. F. Fasse; W. G. Fasse

(57) ABSTRACT

An aircraft, preferably a large capacity passenger aircraft with two passenger decks, has a double-T tail assembly arranged on its tail section. The double-T tail assembly includes a double fin and rudder assembly and a tailplane and elevator assembly, and provides a significant increase in the usable passenger cabin space in the tail section of the aircraft. The double fin and rudder assembly has a U-shaped structure and comprises two upright stabilizer fins connected to each other by a horizontal torsion box that fixedly extends crosswise through the fuselage tail section within the floor of a cabin deck. The tailplane and elevator assembly is pivotably mounted on the upper tips of the two upright stabilizer fins in a double-T arrangement.

24 Claims, 4 Drawing Sheets

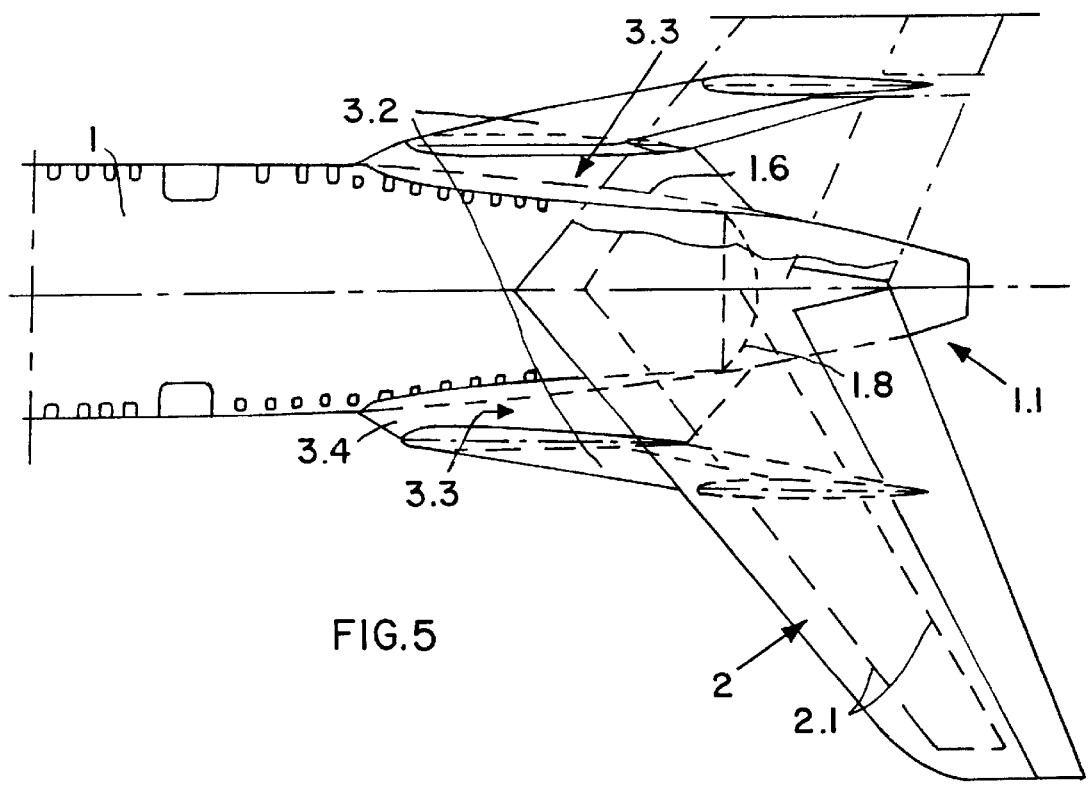
FIG.5
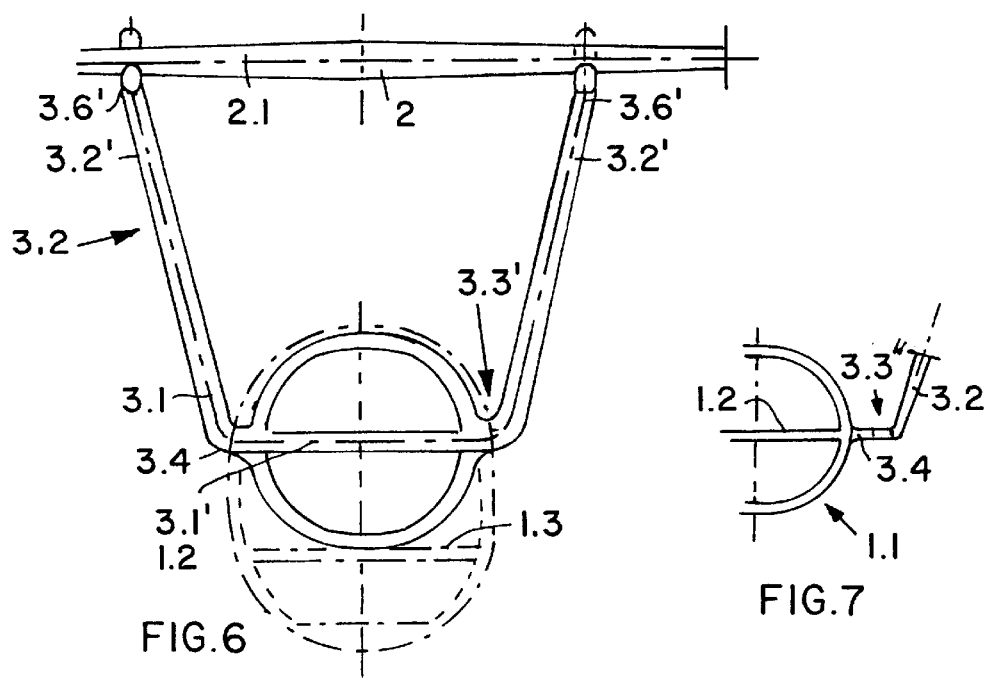
FIG.6
FIG.7

AIRCRAFT WITH A DOUBLE-T TAIL ASSEMBLY

PRIORITY CLAIM

This application is based on and claims the priority under 35 U.S.C. §119 of German Patent Application 199 16 132.1, filed on Apr. 9, 1999, the entire disclosure of which is incorporated herein by reference.

FIELD OF THE INVENTION

The invention relates to an aircraft with dual vertical fins and rudders, and particularly a double-T tail assembly. The aircraft is preferably a large capacity commercial passenger aircraft having two passenger decks.

BACKGROUND INFORMATION

Aircraft with a double fin and rudder assembly, generally called simply a "rudder assembly" herein, arranged on the fuselage are known, particularly as fighter aircraft. In such an application, the double rudder assembly offers advantages over a more common rudder assembly with only a single stabilizer fin, with regard to aerodynamics and weight. For example, the double rudder assembly reduces roll coupling when the rudder is deflected and provides better or more effective rudder action under flow separation conditions (for example, in a tailspin). A double rudder assembly also has a reduced structural weight, for example by reducing bending moments on the rudders, since the span width of each of the vertical fins in a double rudder assembly is smaller than that of a fin in a single rudder assembly.

Another type of double rudder assembly is known in which rudders are arranged as end disks on the outer ends of the tailplane and elevator assembly that is attached to the tail section of the fuselage. This type of stabilizer assembly can also be constructed as a triple rudder assembly, when an additional center rudder assembly is mounted on the tail section (for example: Lockheed "Constellation"). This type of double or multiple rudder assembly in which rudders extend from the outboard ends of the tailplane and elevator assembly is clearly distinguished from double rudder assemblies that extend solely from the fuselage of the aircraft.

With such a double rudder assembly extending directly from the fuselage, a sufficient distance must be maintained between the two stabilizer fins to avoid aerodynamic interference between the two fins. Generally, this means that the tail section of the fuselage must be wide enough to provide sufficient space to mount the two vertical fins the necessary distance apart. Such a wide tail section is provided, for example, when two tail section jet engines are arranged side-by-side, or when the rudder assemblies extend from the inner tailplane and elevator structure, such as is often the case in present day fighter aircraft.

For various reasons, double rudder assemblies are hardly ever used on aircraft other than fighter aircraft. The tail sections of present day commercial or private aircraft are generally constructed as slender spindle-shaped bodies. This construction makes it difficult to provide double rudder assemblies that extend from the tail section of the fuselage because the fuselage width of the aircraft is generally not wide enough to provide a sufficient spacing between the two rudders. If a double rudder assembly is used, then the rudder assembly is generally a so-called V-rudder assembly and/or the aircraft fuselage tail section is not cone shaped, but rather, ends as a broad flat edge. This construction is not typical of modern commercial aircraft because of increased air flow resistance at the tail section.

An example of an aircraft with a broad flat tail section and V-rudder assembly is described in the magazine FLIGHT 08 of May 14, 1996, whereby the aircraft described is a special military aircraft. V-rudder assemblies have disadvantages that make them difficult to use on commercial aircraft. For example, they give rise to axial coupling in the steering control of the aircraft, which, in commercial transport aircraft causes difficulties above all with the development of effective autopilot systems and with the regulatory approval or certification thereof.

The possibility of extending double rudder assemblies from a tailplane and elevator assembly mounted on top of the fuselage tail section is hardly feasible in commercial aircraft because the tailplanes are tiltable for trimming and thus have a moveable torsion box. The situation is different with fighter aircraft, in which the tailplane and elevator assembly halves are mounted on pivot pins outside the double rudder assemblies. Considerations of weight and aerodynamics, however, make such a solution impractical for commercial aircraft.

The typical tail assembly or empennage of a present day commercial aircraft, unless it is a so-called T-tail assembly which will be discussed below, comprises a vertical rudder assembly fin and an elevator assembly fin or tailplane that are coupled to the tail section cone at approximately right angles to each other, as can be seen in FIG. 1. In order to comply with the area rule that is strived for in the transonic speed range, the cross-section of the tail section cone is constricted where the rudder and elevator assemblies intersect with the tail section, for example in a so-called wasp waist or in the shape of a Coca Cola® bottle, as shown in FIG. 2. The elevator assembly fin or tailplane should be constructed so as to be trimmable, i.e. pivotable, within a certain angular range. In practical applications, the torsion box of the elevator assembly fin or tailplane penetrates through the tail section of the fuselage and the tailplane is pivotably mounted and supported relative to the tail section by means of bearing mounts and adjusting or positioning jacks. Accordingly, an opening in the tail section must be large enough to accommodate the tailplane torsion box as well as space for the motion of the torsion box in the trimming range of the elevator assembly tailplanes, as shown in FIG. 3. Furthermore, cover plates must be provided on the elevator and tailplane assembly to cover the torsion box opening to prevent airflow into the tail section at any position of the tailplane. Since the opening to be covered is rather large, this is generally achieved only when the form of the ribs in the area around the opening in the tail section is flattened to a certain extent. This, together with the constriction of the tail section results in a spherically curved or irregular surface form that adds to the complexity and cost of manufacturing the aircraft.

The fact that a significant portion of space in the tail section is unavailable for productive use, e.g. as cabin space, is a major disadvantage of the conventional tail section shown in FIGS. 1 to 3. This fact has particularly negative consequences for large high capacity commercial aircraft, and particularly for an aircraft that has two passenger decks, such as is shown in FIGS. 1 and 2. If the tailplane and elevator assembly could be mounted external to the tail section in a different arrangement, then it would be possible to gain additional usable fuselage length in the tail section by as much as a fuselage length AL, shown in FIG. 1. In addition, it would then be possible to construct the tail section of the aircraft with a fuller or wider contour, as indicated by the dotted lines in FIG. 1. This fuller contour also provides additional usable space or fuselage volume, and allows increasing the height of the ribs for introducing tail assembly forces. Furthermore, the contour indicated by the dotted lines in FIGS. 1 and 2 provides a more regular body surface that is simpler and, thus, less costly to manufacture.

A T-tail assembly, that is, an assembly in which the tailplane and elevator assembly is mounted on the upper end of the vertical fin and rudder assembly, provides a way of arranging the tailplane and elevator assembly external to the tail section. One consequence of the T-tail assembly is that the forces on the tailplane and elevator assembly must be transmitted and introduced through the vertical fin into the tail section cone. The connecting ribs for the vertical fins must be dimensioned accordingly, that is, they must be larger in order to carry the additional forces from the tailplane and elevator assembly. Heavier dimensioned ribs increase the weight and also interfere with the amount of cabin space that can be used in the tail section because of their larger dimensions. Consequently, the additional tail section space gained from eliminating the torsion box of the tailplane and elevator assembly from the tail section is not fully available for use as productive cabin space.

OBJECTS OF THE INVENTION

In view of the above it is the aim of the invention to achieve the following objects singly or in combination:

to provide additional usable cabin space in the tail section of a large commercial aircraft having two passenger decks;

to provide a tail unit torsion box arrangement in an aircraft that requires no freedom of movement, and provides an especially stable support for the tail unit;

to provide a more regular contour of the tail section, thereby reducing manufacturing costs;

to reduce the structural height of the tail assembly, thereby reducing the overall height of the aircraft, simplifying maintenance, and lowering the minimum hangar height;

to improve the aerodynamics of the aircraft by minimizing aerodynamic interferences; and to reduce roll coupling forces and other undesired secondary aerodynamic forces exerted on the aircraft by rudder deflections.

The invention further aims to avoid or overcome the disadvantages of the prior art and to achieve additional advantages, as are apparent from the present specification.

SUMMARY OF THE INVENTION

The above objects have been achieved by providing an aircraft with a double-T tail assembly. A double rudder assembly has a U-shaped structure that consists of two vertical fins connected to each other by a torsion box. The horizontal portion of the torsion box is arranged within the floor of a cabin deck. A tailplane and elevator assembly is pivotably mounted at the upper ends of the vertical stabilizer fins in a double T-arrangement.

A further embodiment of the invention provides that the horizontal portion of the rudder torsion box is arranged particularly within the upper passenger deck floor of a large capacity commercial aircraft having two passenger decks.

In the aircraft according to the invention, the tail assembly torsion box takes up a large portion of the forces arising on the two vertical stabilizer fins. The construction of the torsion box takes advantage of the height or thickness of the cabin floor and extends continuously across the tail section, enclosed within the cabin floor. This arrangement provides additional usable cabin space within the tail section, without requiring that the height of the ribs be significantly increased. Moreover, the tail assembly torsion box according to the invention is fixedly installed and does not require any movement clearance, in contrast to the above discussed pivotable tailplane torsion box that required a certain freedom of movement for trimming. Since the tail assembly torsion box does not require additional space to allow for movement, it does not require a large opening for the torsion box extending transversely through the tail section. Furthermore, the tail section can have a fuller, more regular shape because it is not necessary to constrict the cross-section of the tail section to the extent necessary with conventional aircraft in which both rudder and elevator assemblies intersect with the tail section. This results in a greater available interior space and simplifies the manufacture of the aircraft.

A further advantage of the double rudder assembly according to the invention is that the wider fuselage and the fixed transverse torsion box provide a broad, stable support base for mounting the vertical fins, which in turn provide a stable structure for carrying the tailplane and elevator assembly. The double vertical fins are lower in height than is the fin of a conventional single rudder assembly. This lower height offers advantages in that it reduces the overall height of the aircraft, which simplifies maintenance and lowers the minimum height for aircraft hangars. The smaller dimensions of the double-T tail assembly and the broader support base for the tailplane and elevator assembly in comparison to the conventional embodiment in FIG. 1 also enable a reduction in the structural weight of the tail assembly, including the vertical fin and rudder assemblies, as well as the horizontal tailplane and elevator assembly.

A further feature of the invention relates to the advantageous aerodynamics of the combination of the double rudders and tail section. The two upright stabilizer fins are arranged relatively far outboard on the horizontal portion of the tail assembly torsion box, and are further provided with a root fairing, as can be seen in the plan view or top streamline view of the tail section shown in FIG. 5. This arrangement provides for a large distance between the upright stabilizer fins, which minimizes aerodynamic interferences. Furthermore, the flow channel formed between the fuselage tail section and the upright stabilizer fins is large enough to avoid the occurrence of overspeed flow conditions. In addition to weight and cost advantages, a lower height of the double rudder assembly also results in reduced roll coupling forces upon deflection of the rudders.

According to the invention, the T-configuration tailplane and elevator assembly is trimmably (e.g. pivotably) mounted on the upper tips (or near the upper ends) of the two upright stabilizer fins. The tailplane torsion box is pivotably mounted in the area of the tailplane front spar, and a positioning cylinder or jack is mounted on the rear spar of the respective upright fin and connected to the rear spar of the tailplane, as shown in FIG. 8. With this solution, only relatively small cover plates are required at the ends of the tailplane torsion box to block air flow into the tail assembly.

The proper trouble-free pivot geometry is ensured when the fin tips are oriented perpendicular to the horizontal plane of the tailplane assembly. When the upright stabilizer fins are arranged in a slight V-shape, i.e. when the fins are tilted somewhat outwardly rather than vertically upward, the upper tips of the fins must be correspondingly shaped to bring the upper tips of the fins into a substantially perpendicular orientation relative to the horizontal plane of the tailplane assembly. For example, the tip portion of each fin is kinked or bent slightly inwardly relative to the rest of the fin, as shown in FIG. 9. The slight V-shape or tilt of the fins improves the resistance aerodynamics without creating any significant axial coupling effects. The mounting of the tailplane and elevator assembly according to the invention furthermore ensures that the leverage ratios between the pivot point, the positioning cylinder or jack, and the aerodynamic pressure point are comparable with those of the conventional tailplane assembly shown in FIG. 1.

BRIEF DESCRIPTION OF THE DRAWINGS

In order that the invention may be clearly understood, it will now be described in connection with example embodiments, with reference to the accompanying drawings, wherein:

FIG. 5 is a top plan view of the aircraft tail section of FIG. 4;

FIG. 6 is a cross-sectional view of the tail section of the aircraft having the double-T tail assembly according to the invention, along the section line VI—VI in FIG. 4, showing the horizontal portion of the torsion box arranged in the upper deck floor, and a tailplane and elevator assembly mounted on the slightly V-shaped double rudder assembly;

FIG. 7 is a partial sectional view of the aircraft shown in FIG. 6, but taken along the section line VII—VII in FIG. 4, further toward the rear of the tail section;

DETAILED DESCRIPTION OF PREFERRED EXAMPLE EMBODIMENTS AND OF THE BEST MODE OF THE INVENTION

Figure 1:
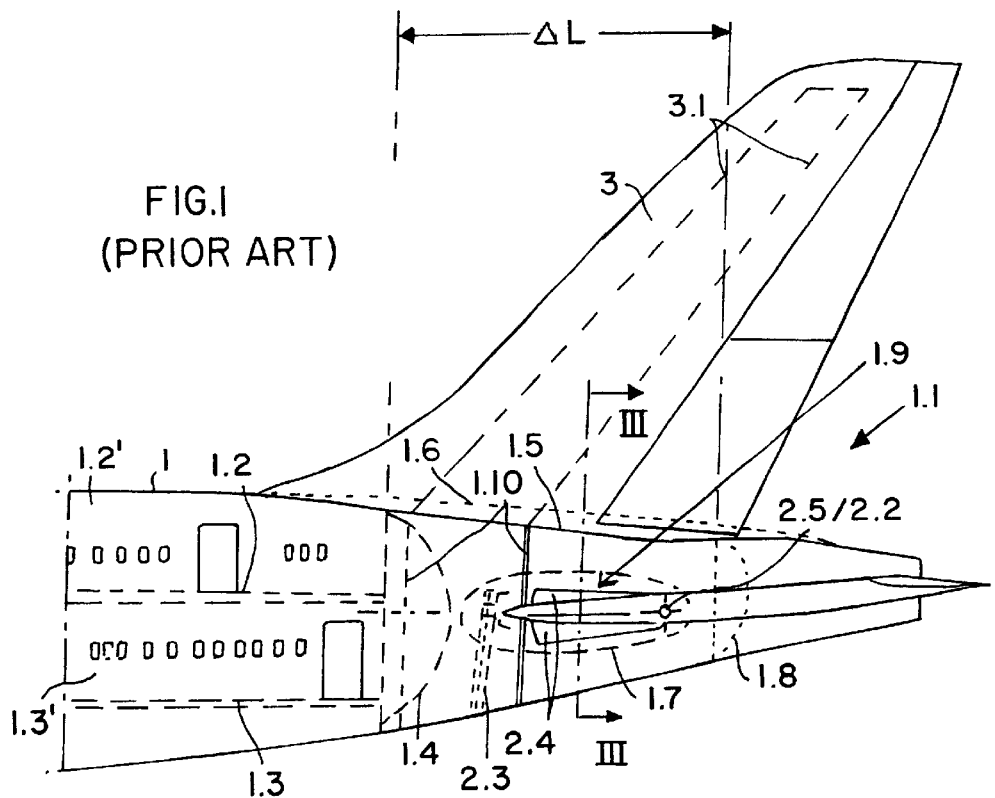
FIG. 1 is an elevation view of a tail section of a large capacity commercial passenger aircraft having two passenger decks, showing the arrangement of the vertical fin and horizontal tailplane assemblies, and showing a comparison of the shape of the conventional fuselage tail section (solid lines) and an aircraft with a double-T tail assembly according to the invention (dotted lines)
Figure 2:
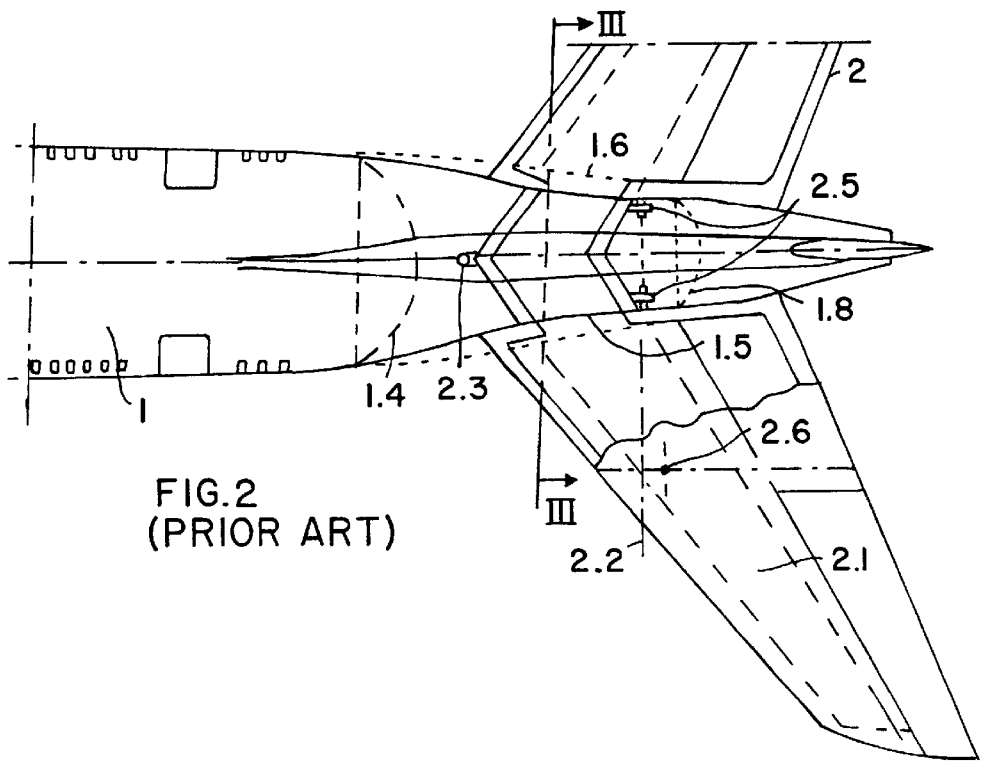
FIG. 2 is a top plan view of the conventional aircraft of FIG. 1 (solid lines) and a fuselage tail section contour of an aircraft according to the invention (dotted lines)
Figure 3:
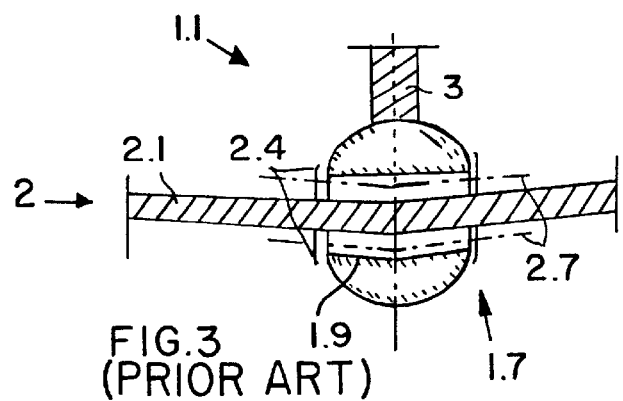
FIG. 3 is a partial cross-sectional view of the aircraft having conventional tail assemblies according to FIG. 1, along the section line III—III in FIG. 2, showing the tailplane torsion box extending through the tail section of the aircraft.

FIGS. 1, 2 and 3 show a portion of a fuselage 1 of a conventional, large capacity commercial aircraft having two passenger decks. The fuselage 1 has an upper deck 1.2 and a main deck 1.3 and a conical-shaped tail section 1.1. A fin and rudder assembly 3 and a tailplane and elevator assembly 2 are attached to the tail section 1.1. A tailplane torsion box 2.1 of the tailplane assembly 2 extends crosswise through the tail section 1.1, preventing this space in the tail section 1.1 from being used as passenger cabin space. In this conventional type of construction, the forces from the fin and rudder assembly 3 are transmitted by a fin torsion box 3.1 to rudder connecting ribs 1.10. These ribs further limit the space that is available for use as passenger cabin space. As a result, a large portion of the space in the tail section 1.1 cannot be used productively as passenger cabin space for the upper deck 1.2 or the main deck 1.3. A pressure bulkhead 1.4 forms the rear closure of the cabins of the upper deck 1.2 and the main deck 1.3. As can be seen in FIGS. 1 and 2, the cross-section of the tail section 1.1 at the rearward end of the upper deck cabin 1.2' and the main deck cabin 1.3' is relatively large, and consequently, the surface area of the bulkhead 1.4 (as shown in dashed lines) is correspondingly large, strong, and heavy.

For purposes of reducing air resistance, the tail section 1.1 has a narrowed waist or constriction 1.5. If the tailplane and elevator assembly 2, shown in FIG. 2 with thick dark outlines, did not penetrate through the tail section 1.1, then the constriction 1.5 would be unnecessary and a fuselage contour 1.6 without constriction would be possible. This would provide greater available space or usable volume in the tail section 1.1. Above all, the upper deck cabin 1.2' and the main deck cabin 1.3' could then extend further into the fuselage tail section 1.1 by a distance ΔL. In addition to providing more productive passenger cabin space, extending the cabins rearward would also result in a smaller surface area of the repositioned pressure bulkhead 1.8 (shown in FIGS. 1 and 2 as a dotted line) and this, in turn, would reduce the required strength and weight of the bulkhead 1.4.

Because the tailplane and elevator assembly 2 is pivotally adjusted or trimmed vertically during flight, and the tailplane torsion box 2.1 penetrates through the tail section 1.1, a fuselage opening 1.9 must be provided for the torsion box 2.1, and a certain amount of free trimming clearance space must be provided above and below the torsion box 2.1 in the tail section 1.1. A conventional tail section opening 1.9 and the clearance space 2.7 that is required to accommodate the torsion box 2.1 can be seen in FIGS. 1 and 3. Cover plates 2.4 are necessary to cover the resulting air gaps in the tail section opening 1.9 to prevent air from flowing into the tail section 1.1 and achieve acceptable aerodynamic performance. The gaps are relatively large and generally it is necessary to flatten the tail section contour as shown by a flattening 1.7. This requirement, together with the conventional constriction 1.5 of the tail section 1.1, creates an irregular tail section surface contour that adds to the complexity and costs of manufacturing the aircraft.

A pivot axis 2.2, a positioning spindle or jack 2.3, and bearing mounts 2.5 serve to trim the tailplane and elevator assembly 2. The arrangement of the trim components relative to the aerodynamic pressure point 2.6, as well as the resulting effective lever arms, are shown in FIG. 2. The required boundary conditions are that the pressure point 2.6 lies rearward of the pivot axis 2.2 (because the weather vane or wind sock effect is a stabilizing influence) and that the positioning spindle or jack 2.3 is provided with sufficient leverage (to reduce the required spindle force).

The fuselage tail section of a large capacity commercial passenger aircraft having two passenger decks and a double-T tail assembly 3A according to the invention is shown in FIGS. 4 to 9. Identical reference numbers have been used for the individual components that correspond to components shown in FIGS. 1 through 3. The double-T tail assembly 3A includes a double-T mounted tailplane and elevator assembly 2A and a double fin and rudder assembly 3.2. As can be seen in FIG. 6, the stabilizer fin torsion box 3.1 of the double rudder unit 3.2 is U-shaped. A horizontal portion 3.1' of the torsion box 3.1 extends through the tail section 1.1 in the cabin floor of the upper deck 1.2. Thus, neither the tailplane torsion box 2.1 nor the fin torsion box 3.1 extends into the upper cabin space 1.2' or the main cabin space 1.3'.

Figure 4:
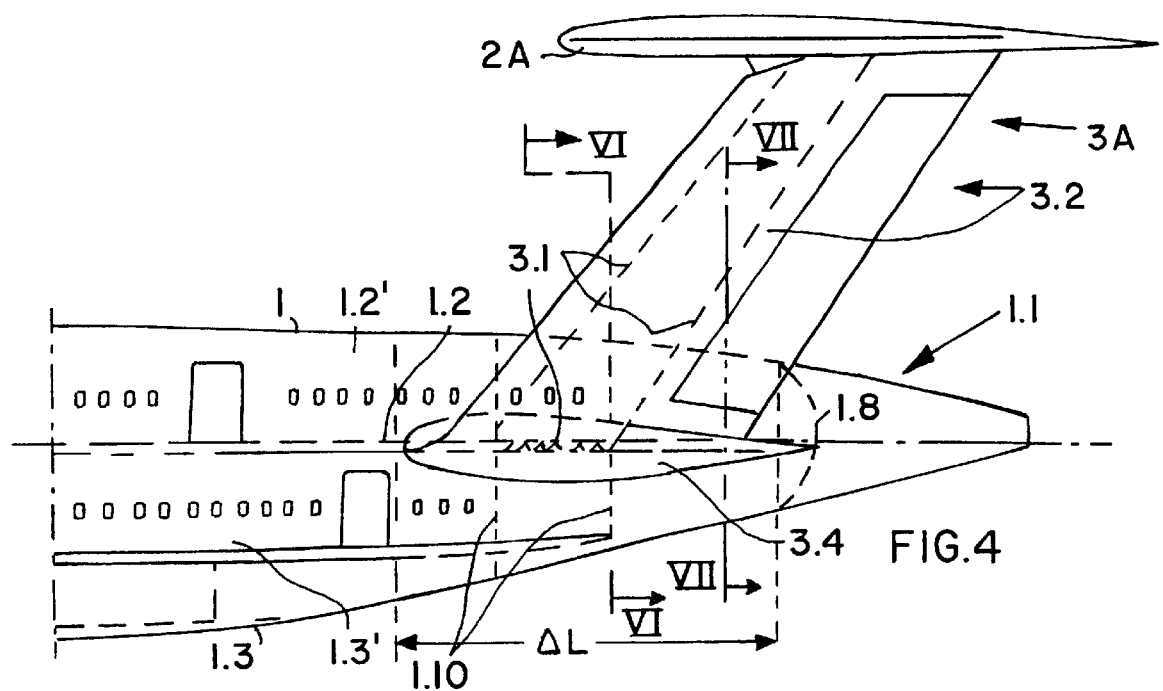
FIG. 4 is an elevation view of the tail section of a large capacity commercial passenger aircraft having two passenger decks, showing the arrangement of the double-T tail assembly according to the invention on the tail section.

The passenger cabin space and the conventional pressure bulkhead 1.4 (FIG. 1) can be extended rearward into the tail section 1.1 by the distance ΔL to the position 1.8, as shown in FIG. 4. This provides several advantages: more cabin space is usable as passenger cabin space in the upper deck 1.2 and the main deck 1.3. Since the cross-section of the tail section 1.1 is smaller at the rearward end of the extended cabin space, the surface area of the rearward-displaced pressure bulkhead 1.8 is smaller and, consequently, the bulkhead does not need to be as strong and will also be lighter in weight. Also, the fuselage tail section according to the invention has a fuller cross-section contour 1.6 without the conventional constriction 1.5 (i.e. the outer surface contour is everywhere convex without a concave portion, or stated differently, the curvature of the outer contour does not include a curvature inflection). The fuller contour 1.6 also provides more useable cabin space, as discussed above.

An additional advantage of having the horizontal portion 3.1' of the torsion box 3.1 extend through the tail section 1.1 is that it provides a broad support base for the double-T assembly 3A. The two stabilizer fins 3.2' have respective upright torsion box portions that are connected to or integrally extend from the horizontal position 3.1' of the torsion box 3.1 at respective lateral ends of the horizontal portion 3.1' of the torsion box 3.1. This is a very strong and stable structure. The tailplane torsion box 2.1 is pivotably mounted on a upper tip 3.6 on each of the stabilizer fins 3.2' of the double rudder 3.2, as can be seen in FIG. 6.

A flow channel 3.3 is dimensioned to be sufficiently large to ensure an aerodynamically advantageous airflow about the tail section 1.1, between the double rudder 3.2 and the tail section 1.1. The stabilizer fins 3.2' are not mounted directly on the tail section 1.1, but rather, are mounted further out from the tail section 1.1 with a fin root fairing 3.4 arranged therebetween as shown in FIGS. 5 and 6. The flow channel 3.3 is formed in the forward area of the double rudder 3.2 as a rounded tear drop shape, as shown in FIG. 6. The profile of the flow channel 3.3 becomes flatter and wider toward the rear section of the fin root fairing 3.4, as shown in FIGS. 5 and 7. In other words, the fin root fairing 3.4 is preferably shaped to accommodate the progression of the flow lines along the fuselage 1 of the aircraft in order to minimize interference resistances. In contrast to the conventional tail assembly configurations having a movable tailplane and elevator assembly 2 arranged in the tail section 1.1, shown in FIG. 1, in which the large gap covers 2.4 are required to cover the tail section opening 1.9, the fin root fairing 3.4 according to the invention is a continuous and fixed component on the tail section 1.1. This further improves the airflow of the double-T tail assembly 3A between the fuselage 1 and the upright stabilizer fins 3.2'.

Figure 8:
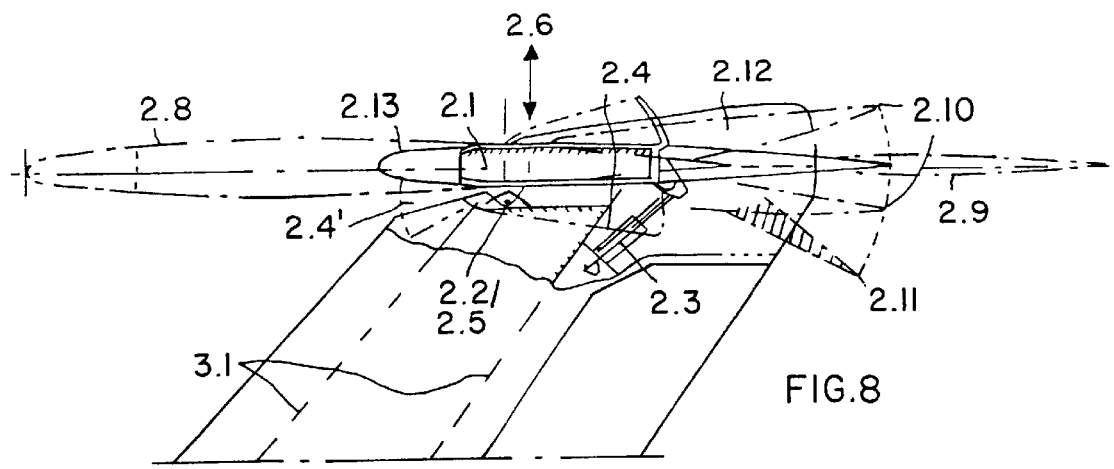
FIG. 8 is a lengthwise sectional view of the tailplane and elevator assembly mounted on an upright stabilizer fin.
Figure 9:
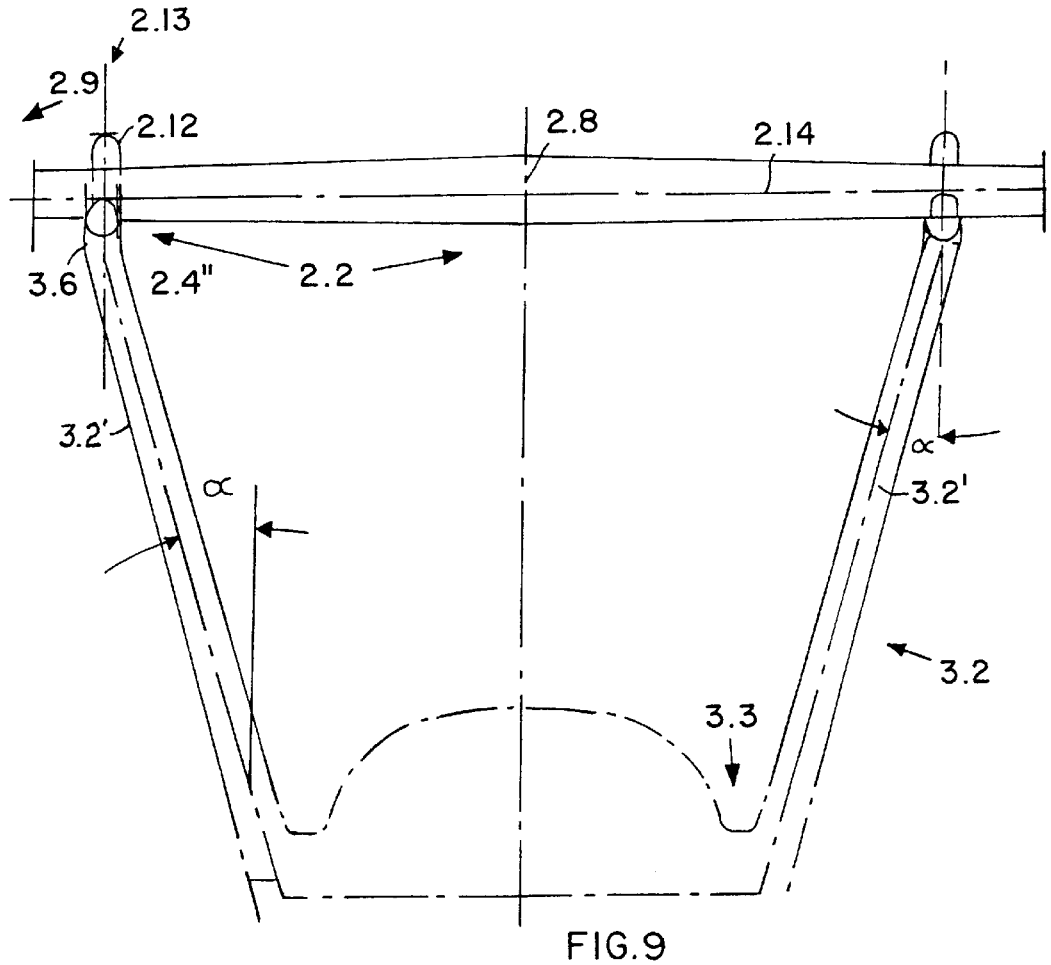
FIG. 9 is an enlarged detail view of a portion of FIG. 6, showing a bend in the upper tips of the upright stabilizer fins.

FIGS. 8 and 9 show details of the tailplane assembly and particularly the tailplane torsion box 2.1 that is mounted pivotably on the upper tips 3.6 of the respective stabilizer fins 3.2'. The torsion box 2.1 is pivotable about the pivot axis 2.2. The inner or central profile 2.8 and the outer or outboard profile 2.9 of the tailplane assembly are respectively shown with broken lines in FIG. 8, while the tailplane profile 2.13 directly at a plane in the stabilizer fin is shown with solid lines. The torsion box 2.1 is drawn with thick lines. The tailplane and elevator assembly 2A can be pivoted as an entire unit by means of the positioning spindle or jack 2.3 about the pivot axis 2.2, i.e. about the tailplane and elevator assembly bearing mounts 2.5. The possible trimming range 2.10 is illustrated in FIG. 8 by dot-dash outlines. A downward deflection of an elevator 2.11 is shown superimposed on the downward tailplane trimming deflection 2.10. A simple fixed fin tip fairing 2.12 serves to cover the gap about the rudder. A disk-shape gap fairing 2.4' covers the gap in the area of the tailplane profile nose. Two lateral cover shields 2.4" shown in FIG. 9 cover the gaps between the respective fins 3.2' and the torsion box 2.1.

The leverage ratios of the tailplane and elevator assembly bearing mounts 2.5 (or pivot axis 2.2), the trim positioning spindle or jack 2.3, and the aerodynamic pressure point 2.6 of the assembly 2A according to the invention are comparable to those of the conventional assembly 2 shown in FIG. 1, so that the above mentioned boundary conditions of the arrangement of the trimming components can certainly be satisfied by the arrangement according to the invention. Furthermore, the fin and rudder assembly 2.2, as can be seen in the front view in FIG. 9, provides a broader support base at 2.13 for the tailplane and elevator assembly 2A than is provided by the conventional arrangement of the tailplane and elevator assembly 2 directly mounted on the tail section 1.1. This broader base provides advantages with regard to weight and stability.

The horizontal plane 2.14 of the tailplane and elevator assembly 2A must be perpendicular to the pivot plane 2.13 at the respective upper tips 3.6 of the stabilizer fins 3.2'. If the two fins 3.2' of the double rudder 3.2 are mounted with a slight V-shape or tilt relative to each other, for example with an angle α relative to the vertical as shown in FIG. 9, then the upper tips 3.6 of the respective fins 3.2' are bent or angled toward vertical by the same angle a to bring them into a vertical alignment that is perpendicular to the horizontal plane 2.14. In effect, the horizontal portion 3.1' of the stabilizer fin torsion box 3.1, the two fins 3.2', and the center portion 2.8 of the tailplane and elevator assembly 2A form a rectangle or a trapezoid. The forces generated at any location in this force transmitting frame construction are lower than in a construction in which the respective stabilizer components are attached to the respective tail assembly on one end only.

Although the invention has been described with reference to a specific example embodiment, it will be appreciated that it is intended to cover all modifications and equivalents within the scope of the appended claims. It should also be understood that the present disclosure includes all possible combinations of any individual features recited in any of the appended claims. For example, while only a V-configuration of the upright stabilizers has been shown and described, an orientation of each stabilizer fin along a respective vertical plane is also within the scope of the invention. The terms "vertical stabilizer" and "upright stabilizer" herein are each intended to apply both to the vertical orientation and to the V-configuration of the stabilizer fins, and also are not intended to exclude the swept-back orientation as seen in a side view (e.g. FIG. 4).

What is claimed is:

1. An aircraft comprising:
   a fuselage including a fuselage main body, a tail section that extends rearwardly from said fuselage main body, and a first passenger deck floor arranged in said fuselage main body and extending into said tail section;
   a generally U-shaped double fin and rudder assembly comprising first and second upright stabilizer fins extending upwardly respectively at two opposite sides of said tail section, and a horizontal torsion box that extends transversely through said tail section within said first passenger deck floor and that is connected to and interconnects said first and second upright stabilizer fins, and a tailplane and elevator assembly that is arranged above said tail section and is pivotably connected to said first and second stabilizer fins respectively.

2. The aircraft according to claim 1, wherein said first and second upright stabilizer fins respectively have upper fin tips at upper ends thereof, and wherein said tailplane and elevator assembly is pivotably connected to said upper fin tips of said first and second upright stabilizer fins in a double-T arrangement.

3. The aircraft according to claim 1, wherein said horizontal torsion box is immovably fixed in said tail section.

4. The aircraft according to claim 1, wherein said fuselage further comprises a pressure bulkhead arranged in said tail section and bounding a rearward extent of a passenger cabin in said fuselage, and wherein said horizontal torsion box extends transversely through said tail section at a location forward of said pressure bulkhead with reference to forward and rear ends of said fuselage.

5. The aircraft according to claim 1, wherein said aircraft is a large capacity commercial passenger aircraft having an upper passenger cabin deck and a main passenger cabin deck below said upper passenger cabin deck.

6. The aircraft according to claim 5, wherein said first passenger deck floor in which said horizontal torsion box extends transversely through said tail section is a deck floor of said upper passenger cabin deck.

7. The aircraft according to claim 1, wherein said tail section has a rearwardly tapering outer contour shape without any curvature inflection and without any externally concave contour.

8. The aircraft according to claim 1, wherein said first and second upright stabilizer fins respectively include first and second stabilizer fin bodies and first and second upright torsion boxes arranged respectively within said first and second stabilizer fin bodies, and wherein said first and second upright torsion boxes are respectively connected to said horizontal torsion box.

9. The aircraft according to claim 8, wherein said horizontal torsion box, said first upright torsion box, and said second upright torsion box are each independent components, and wherein said first and second upright torsion boxes are respectively mechanically secured to said horizontal torsion box.

10. The aircraft according to claim 8, wherein said first and second upright torsion boxes are each integrally connected to said horizontal torsion box, and wherein said horizontal torsion box and said first and second upright torsion boxes together form a continuous integral tail unit torsion box.

11. The aircraft according to claim 1, wherein said horizontal torsion box has two opposite ends that protrude laterally outwardly from said tail section of said fuselage, and wherein said first and second upright stabilizer fins respectively have first and second fin roots that are respectively connected to said two opposite ends of said horizontal torsion box, with said first and second upright stabilizer fins respectively spaced laterally outwardly away from said tail section so as to form respective first and second flow channels between said tail section and said first and second upright stabilizer fins respectively adjacent to said opposite ends of said horizontal torsion box.

12. The aircraft according to claim 11, wherein said upright stabilizer fins are respectively spaced laterally outwardly sufficiently far from said tail section to avoid aerodynamic flow interference between said tail section and said upright stabilizer fins.

13. The aircraft according to claim 11, further comprising first and second aerodynamic fin root fairings arranged and extending between said tail section and said first and second fin roots of said first and second upright stabilizer fins respectively so as to improve aerodynamic flow conditions through said first and second flow channels.

14. The aircraft according to claim 13, wherein said fin root fairings each respectively have such a contour shape so that a forward portion of an upper surface of each said fin root fairing has a rounded teardrop shape and a rearward portion of said upper surface of each said fin root portion has a flat planar shape.

15. The aircraft according to claim 1, wherein said first and second upright stabilizer fins each respectively extend upwardly along a vertical plane that is parallel to a longitudinal axis of said fuselage.

16. The aircraft according to claim 1, wherein said first and second upright stabilizer fins each respectively extend upwardly with an outward tilt away from each other, respectively at an angle greater than 0° and not greater than 30° relative to a vertical plane that is parallel to a longitudinal axis of said fuselage.

17. The aircraft according to claim 16, wherein each one of said upright stabilizer fins respectively includes a main fin body that extends upwardly with said outward tilt, and a fin tip portion that extends upwardly from said main fin body along a second vertical plane that is parallel to said longitudinal axis of said fuselage, and wherein said tailplane and elevator assembly is respectively pivotably connected to said fin tip portion of each said upright stabilizer fin.

18. The aircraft according to claim 1, wherein said tailplane and elevator assembly includes a tailplane body, a tailplane torsion box arranged in said tailplane body, and first and second actuatable positioning jacks respectively interconnected between said tailplane body and said first and second upright stabilizer fins, wherein said tailplane body is pivotably connected to said first and second upright stabilizer fins so as to be pivotable about a trimming pivot axis.

19. The aircraft according to claim 18, wherein said tailplane torsion box includes at least a rear spar and a front spar that each extend in said tailplane body transversely between said first and second upright stabilizer fins, wherein said first and second actuatable positioning jacks are respectively connected to said rear spar, and wherein said tailplane and elevator assembly further comprises two pivot axles that form said trimming pivot axis and that are connected to said tailplane torsion box proximate to said front spar.

20. An aircraft comprising:

a fuselage that includes a fuselage main body, a tail section extending rearwardly from said fuselage main body, and a pressure bulkhead arranged in said tail section;

a horizontal torsion box extending transversely through said tail section at a torsion box location forward of said pressure bulkhead;

two upright stabilizer fins respectively connected to said horizontal torsion box and extending upwardly therefrom respectively on opposite sides of said tail section; and a horizontal stabilizer tailplane that is arranged higher than said tail section, spans transversely between said two upright stabilizer fins, and is pivotably connected to said two upright stabilizer fins.

21. The aircraft according to claim 20, wherein said horizontal torsion box is rigidly and immovably secured to said fuselage.

22. The aircraft according to claim 21, wherein said torsion box is a straight linear torsion box beam that extends straight transversely through said tail section.

23. The aircraft according to claim 20, having at least one passenger cabin in said fuselage main body and extending into said tail section rearwardly past said torsion box location.

24. The aircraft according to claim 23, wherein said at least one passenger cabin comprises an upper deck cabin, said aircraft further has a main deck cabin in said fuselage below said upper deck cabin, said fuselage further includes an upper deck floor dividing said upper deck cabin from said lower deck cabin, and said horizontal torsion box extends transversely through said fuselage within said upper deck floor.

\* \* \* \* \*